Jan. 16, 1934.   C. MÜLLER   1,943,899
METHOD AND MEANS FOR ANALYZING AND TRANSLATING ENERGY FORMS
Original Filed Oct. 1, 1928   2 Sheets-Sheet 1
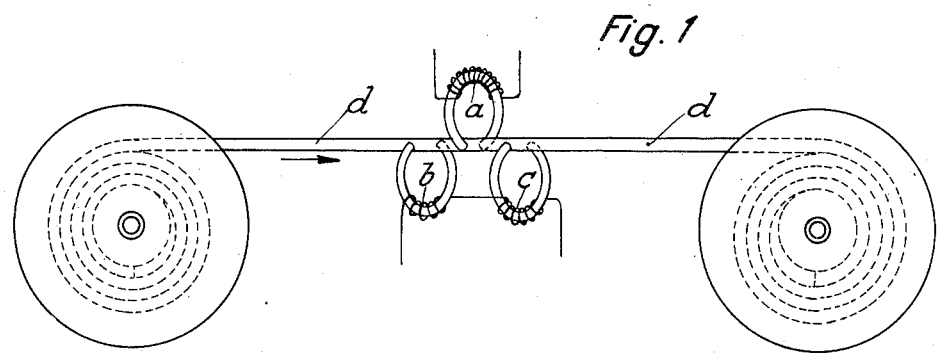
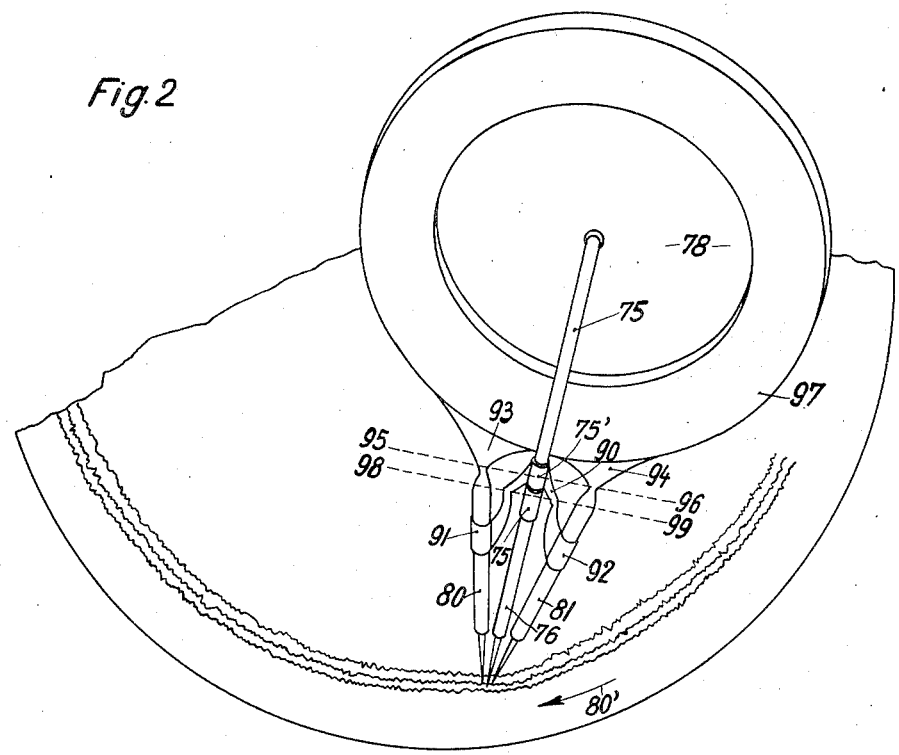

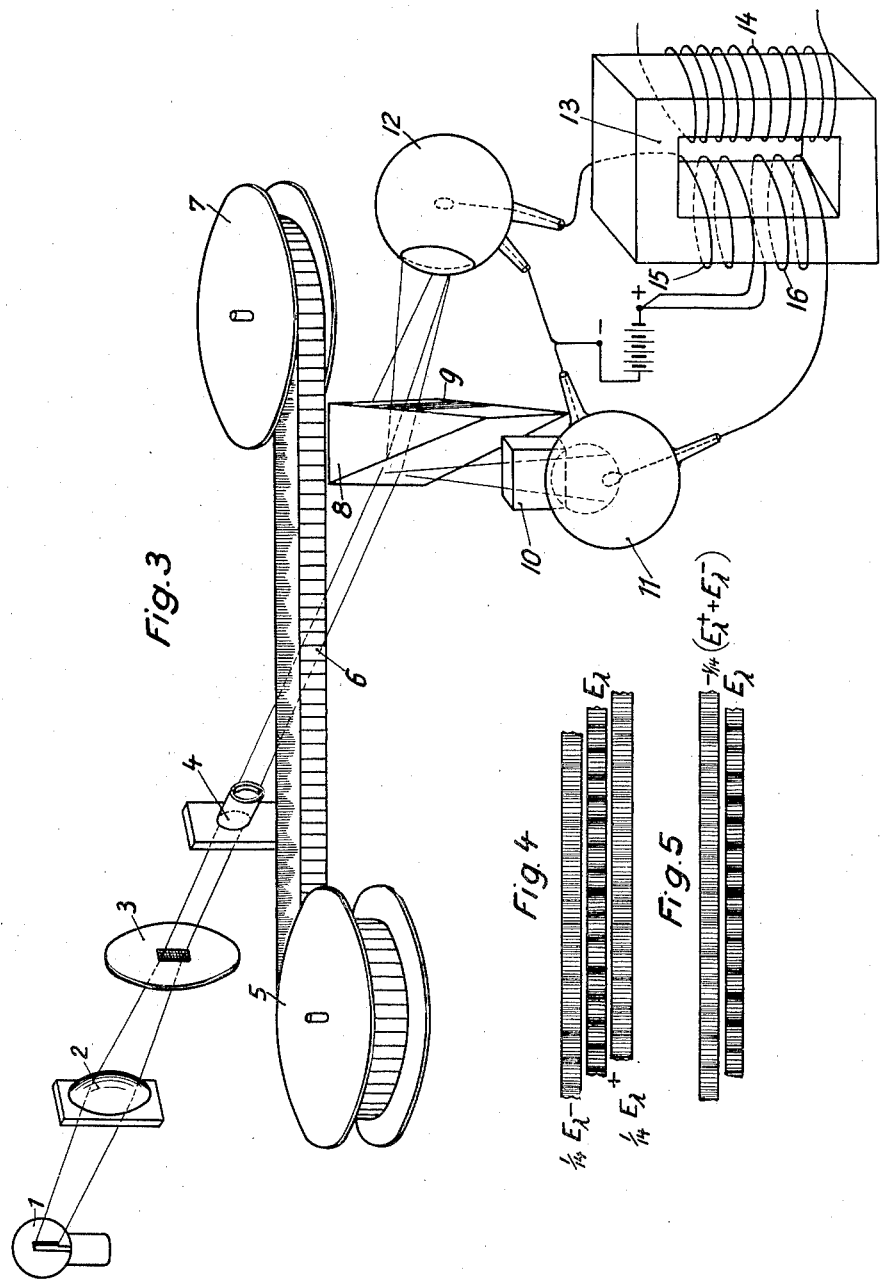

Patented Jan. 16, 1934

1,943,899

UNITED STATES PATENT OFFICE 1,943,899

METHOD AND MEANS FOR ANALYZING AND TRANSLATING ENERGY FORMS

Carl Müller, Berlin-Charlottenburg, Germany

Original application October 1, 1928, Serial No. 309,373, and in Germany October 29, 1926. Divided and this application November 27, 1929. Serial No. 410,222

6 Claims. (Cl. 179—100.3)

My invention relates to a method of, and apparatus for, translating, by process of analysis, spatially or temporally successive energy forms into other energy forms and concerns, more particularly, a method of and means for reproducing sound from a record.

In my co-pending application Ser. No. 309,373, filed October 1, 1928, of which the present application is a division and which is in part a continuation of another co-pending application Ser. No. 229,255 filed October 27, 1927, I have shown that a spectrum, i. e. a spatial succession of varying radiant energies, which is obliterated to a certain extent owing to the finite width of the spectroscope gap, may be correctly analyzed by a method comprising detecting the apparent value (primary value) of the radiation over a finite distance, which includes the point under consideration, by detecting the apparent values (secondary values) of the radiation over finite distances adjacent to that employed for the first-mentioned detection, and by combining the values so obtained to get a result which is proportional to or dependent on a term compounded from said primary value and said secondary value.

If the primary value in any point is designated by $E\lambda$ and the secondary value by $E\lambda+$ and $E\lambda-$, the correct amount in any point sought is (1) $\quad E\lambda^\circ = A[E\lambda - B(E\lambda^+ + E\lambda^-)]$, wherein A and B denote constant coefficients which may easily be found by tests or calculations. If the widths of the measuring elements, i. e. the afore-mentioned distances, equal the width of the spectroscope gap, or in other words, the width of the area which a spectral line occupies in the obliterated spectrum, the coefficient A amounts to 7/6 and B to 1/14.

In order to obtain a still more refined result, I may detect the apparent values $E\lambda^{++}$ and $E\lambda^{--}$ (tertiary values) over finite distances adjacent to that used in the detection of said secondary values and may correctively combine them with the primary and secondary value, for instance as follows:

(2) $\quad C.E\lambda^\circ = E\lambda - D(E^+\lambda + E\lambda^-) + F(E\lambda^{++} + E\lambda^{--})$.

In this formula C, D and F denote again invariable coefficients which may amount to $$\frac{30}{37}, \frac{23}{222} \text{ and } \frac{1}{111}$$

respectively.

Although a detailed explanation of the calculations leading up to the Formulæ (1) and (2) has been given in my afore-mentioned copending application Serial No. 309,373, I shall briefly show hereinafter how these formulæ were developed.

C. Runge, in Zeitschrift fur Mathematik, 1897, page 206, has developed a method of calculation to compensate for the undesired but unavoidable integration which is due to the finite width of the spectroscope slit or gap, by using a differentiation based upon Paschen's equation, compare "Wiedemann's Annalen", vol. 60, 1897, page 712. This method has been extensively used by Paschen and others to correct the results of bolometric measurements of spectra. The calculation method of Paschen and Runge has for its object to find the corrected value of intensity, i. e., the value which would be obtained if a gap of infinitely small width, and a bolometer of infinitely small range, could be provided.

Their method is based upon observing by means of the usual bolometer and of a gap of a substantial width $a$; first, an intensity value $F(x)$ corresponding to a wave length $x$ and, second, the values $F(x-a)$ and $F(x+a)$ corresponding to the wave length $(x-a)$ or $(x+a)$, respectively, which are located to the right and to the left of the first measured point. In order to find the correct value $f(x)$ in the point of the wave length $x$, Runge developed the following progression:

$$af(x) = 2\left\{\frac{F(x)}{2!} - \frac{1}{4!}\Delta^2 F(x) + \frac{(2!)^2}{(6!)}\Delta^4 F(x) - \right.$$

$$\left. \frac{(3!)^2}{8!}\Delta^6 F(x) \ldots - + (-1)^n \frac{(n!)^2}{(2n+2)!}\Delta^{2n}F(x)\ldots \right\} \quad (3)$$

The terms in this equation are intended to mean:

$$\Delta^2 F(x) = \{F(x+a) - F(x)\} - \{F(x) - F(x-a)\}$$
$$\Delta^4 F(x) = \{\Delta^2 F(x+a) - \Delta^2 F(x)\} -$$
$$\{\Delta^2 F(x) - \Delta^2 F(x-a)\} \quad (4)$$
$$\Delta^{2n} F(x) = \{\Delta^{2(n-1)} F(x+a) - \Delta^{2(n-1)} F(x)\} -$$
$$\{\Delta^{2(n-1)} F(x) - \Delta^{2(n-1)} F(x-a)\}$$

If the values $f(x)$ obtained by observation are measured in points spaced by the amounts $a$ from each other, this amount being equal to the width of the gap, the terms $\Delta 2F(x)$, etc., may be calculated by way of a successive formation of differences. However, if $f(x)$ is registered in form of a continuous curve, the following form of a row is preferable:

$$af(x) = F(x) - \frac{1}{6}F_1(x) + \frac{2}{45}F_2(x) - + \ldots \quad (5)$$

wherein $$F_1(x) = \frac{F(x+a) + F(x-a)}{2} - F(x) \quad (6)$$

and $$F_2(x) = \frac{F_1(x+a) + F_1(x-a)}{2} - F_1(x) \quad (7)$$

Paschen adopted the following course in order to correct his bolometrical observations, or, in other words, to correct the curves obtained. He diagrammatically represented the intensities $F(\lambda)$ as a function of the minimum deviation $\lambda$, on the basis of the curve obtained, he calculated the correct value $F_1(\lambda)$ for every single point. Subsequently, the values $F_1(\lambda)$ were graphically recorded and from this new curve the terms $F_2(\lambda)$ were in a similar manner calculated for all points. Finally, the terms $a f(\lambda)$ were calculated by means of formula 3 on the basis of the terms $F_1(\lambda)$, $F_2(\lambda)$ so found.

For the sake of simplicity and clearness, in the following the letter $\lambda$ may designate the wave length, the desired corrected intensity may be designated by $E°\lambda$, the directly measured intensity corresponding to the wave length $\lambda$ may be called $E\lambda$. The width of the spectroscope gap may correspond to that of the bolometer and may amount to $a$. The secondary intensities measured at the points in which the wave length amounts to $(\lambda-a)$ and $(\lambda+a)$ may be called $E^+\lambda$ or $E^-\lambda$ respectively, corresponding to the above mentioned terms $(F(x+a)$ and $F(x-a))$. In a similar manner, $E^{++}\lambda$ and $E^{--}\lambda$ designate those intensities of radiation directly measured in the points which are spaced from the point of $\lambda$ by $2a$ to either side. They correspond, as is obvious, to the aforementioned terms $F(x+2a)$ or $F(x-2a)$, respectively.

The following considerations are based upon the fact that for nearly all practical purposes it is sufficient to know the correct ratio of the intensities corresponding to the various wave lengths.

I have found that Runge's formula, if limited to include the correction terms of the first order only, i. e., the correction terms based upon the first adjacent point $(\lambda+a)$ and $(\lambda-a)$, may be transformed to read as follows:

$$\frac{6}{7}E°\lambda_1 = E\lambda_1 - \frac{1}{14}(E\lambda^+_1 + E\lambda^-_1) \quad (8)$$

or $$E°\lambda_1 = \frac{7}{6}\left[E\lambda_1 - \frac{1}{14}(E^+\lambda_1 + E\lambda^-_1)\right] \quad (8a)$$

This formula relates to the wave length of $\lambda_1$. Accordingly, the formula relating to another wave length $\lambda_2$ would read:

$$\frac{6}{7}E°\lambda_2 = E\lambda_2 - \frac{1}{14}(E\lambda^+_2 - E\lambda^-_2)$$

The above mentioned detailed formula 3 may be transformed in a similar manner, including the correcting terms of first and second order to read as follows:

$$\frac{30}{37}E°\lambda = E\lambda - \frac{23}{222}(E^+\lambda + E\lambda^-) + \frac{1}{111}(E\lambda^{++} + E\lambda^{--}) \quad (9)$$

If the coefficients in Formulæ (8a) and (9) are replaced by A, B, C, D or F, respectively, as defined hereinbefore, it will be seen that the Formulæ (1) and (2) will be obtained.

I have found that the principle explained heretofore which resides in the method of compensating for the undesired effects produced by the finite resolution in the analyzing process by varying the translated response from one elemental unit of energy in accordance with that derived from energies of the second or third order, is primarily applicable to the analyzation of sound records, that is, to the reproduction of sound from records. It is well known in the art that the problem of reproducing sounds in a perfectly natural manner offers considerable difficulties which are due to the hitherto unavoidable suppression of the highest acoustic frequencies, the absence of which in reproduced music renders the latter dull. For this reason, it has been called "canned" music. The primary object of my invention is to reproduce even the highest acoustic frequencies.

Other objects of my invention, the features of novelty, and various manners in which the same may be performed, will appear from the description following hereinafter which, however, is intended to explain and not to limit the scope of the invention defined in the appended claims.

In the drawings

Fig. 1 illustrates the application of my invention to the reproduction of sound from a magnetic record wire;

Fig. 2 is a perspective view of a phonographic reproducer embodying the principles of the present invention;

Fig. 3 shows a reproducer for talking movie pictures;

Figs. 4 and 5 are diagrammatic illustrations of photographic steps in the method of reproducing a photographic sound record.

My invention is applicable, for instance, to instruments registering a succession of electric impulses by energizing a wire of magnetic material. Such instruments are being used for sound recording purposes or for picture transmission and reproduction, and comprise a small electromagnet energized by the electric current fluctuations to be registered. The wire is fed past this magnet and permanently magnetized in conformity with the variable magnetic field.

For the purpose of reproducing the magnetic record impressed on the wire or any other suitable body, the wire is moved past the core of an induction coil whereby a current is induced therein in conformity with the variable magnetism recorded. This method of recording and reproducing electric fluctuations originally intended for sound recording purposes only, has been suggested by W. Friedel as a satisfactory means for picture transmission and television. The reproduced fluctuating current may be amplified and subsequently translated into sound or optical fluctuation, as the case may be.

It is obvious that like a spectrum the magnetic record is always obliterated to a certain extent. Hence, it is desirable to arrange in the reproducing apparatus secondary induction coils controlled by adjacent sections of the record wire and connected so as to counteract the effect produced in the main induction coil. The result will be the partial or total elimination of the effects of the obliteration whereby the sound is better and more naturally reproduced. Similarly to the conditions prevailing in the spectroscopic field, an essential advantage obtained by the invention resides in the fact that larger electromagnet cores covering a longer portion of the record wire may be used whereby a longer section of the magnetic record is operative at a time upon the electromagnet and, accordingly, exerts a more powerful inductive effect without involving the disadvantage of a distorted fluctuation diagram. As a consequence, less amplifier stages are required. In case it is desirable to use for a certain record as small a quantity of record material as possible, my invention provides the possibility of crowding the magnetic record close together without obliterating its accuracy, so that on a short and thin wire, for instance, a long musical piece may be recorded.

In Fig. 1 I have shown an embodiment of a wire controlled receiver or translator constructed in accordance with my invention. For the sake of simplicity only the vital parts are illustrated. $a$ designates the primary electromagnet having an annular core slit at one point to allow the passage of the permanently magnetized wire or web *d* wound upon a suitable roll wherefrom it is drawn by another driven roll with a predetermined speed by suitable means (not shown).

Adjacent to and spaced from this electromagnet are arranged the secondary or auxiliary electromagnets *b* and *c* of similar design which are actuated by such units of the wire which are adjacent to the unit controlling at the same time the primary electromagnet. The distance of the electromagnets depends on the characteristics of the magnetic record and may easily be determined by tests to obtain the optimum in effect. In order to proportion the voltages induced in the electromagnets in accordance with the requirements, the coils are formed of an appropriate number of windings and/or the electromagnets are movably arranged relative to the wire so that they may be spaced therefrom by a suitable adjustment. The three coils are preferably so interconnected that the voltage induced in the primary coil is counteracted by the voltages produced in the secondary windings in the sense of Formula 1 to give the desired corrective effect. It is to be understood, of course, that the ratio given in Formula 1 does not necessarily give the best possible results in this case, but that the distance of the electromagnets and their ratio in voltage is preferably determined by a test.

This method of reproducing a temporal succession of electric energies by means of a permanently magnetized movable body is capable of manifold applications in the art of recording, transmitting and reproducing sounds.

In the following I shall describe my invention as applied to an ordinary phonograph, the diaphragm of which is operated or controlled by a record plate upon which the sound is recorded in form of a wave shaped groove. In Fig. 2 I have illustrated the record plate with circular record grooves and a diaphragm operated thereby. The arrangement comprises a primary stylus 76 the oscillation of which is correctively affected by secondary styli 80, 81 guided in the same groove and operated upon at any time by sections thereof adjacent to the section engaging the primary stylus.

The primary stylus 76 is fastened in a suitable manner to a double-armed lever 75 supported on the frame of the diaphragm. It may be swung about an axis 98—99 and has its upper end connected to the center of the diaphragm 78 to impart the oscillations thereto. In order correctively to affect these oscillations, the supporting structure carrying this lever 75 is subjected to the combined control of the secondary ranges of the record groove. It comprises the two secondary styli 80 and 81 connected with the frame of the diaphragm 78 by means of recessed spring leaves 93 and 94 which may be swung about an axis 95—96. The styli 80, 81 are slipped into sleeves 91 and 92 which are fastened to the springs 93 and 94 and to spring leaves 90 downwardly extending from a sleeve 75' carrying the lever 75. The spring leaves are so recessed as to insure the indicated position of the respective axes of oscillation.

The operation is as follows: When the lower end of stylus 76 is moved to the right when viewed in the direction of arrow 80', its upper end will be moved to the left by a certain amount representing the ordinate of the diagram of the sound oscillation produced. This amount is reduced when the axis 98—99 partakes in the movement to the right to a limited degree, and, in fact, the axis 98—99 does move under the control of the secondary styli 80 and 81 which cause a displacement of said axis on account of the distance between axis 98—99 and 95—96. Hence, it will appear that the effect of the secondary styli upon the lever 75 is similar to the cooperation between the primary electromagnet and the secondary electromagnet shown in Fig. 1 residing in an automatic corrective affection in the sense of Formula 1.

The distance between the axes 98—99 and 95—96 determines the magnitude of the corrective coefficient and may be dimensioned to comply with the particular requirements. The diaphragm may either directly produce the sound or may control another diaphragm in any suitable manner well known in the art.

While the three styli are shown as being spaced apart from each other by a substantial amount, it is to be understood that the distance is in fact much smaller. In order to compensate for an undesired displacement of a stylus with regard to the level determined by the record plate I provide suitable resilient means permitting the three styli to automatically adjust themselves to the same level. In the embodiment shown this function is performed by the spring leaves 90.

The entire support is preferably formed as a unitary structure of stamped metal to which the three styli, preferably of tungsten, are electrically welded, and which is to be attached to the diaphragm in place of the customary single stylus. While in the embodiment shown, the resilient supporting structure is formed by spring leaves, any other suitable resilient support may be provided, for instance styli embedded in rubber. The primary stylus may be embedded in a rubber body carried by a slit sleeve which is connected to the frame of the diaphragm by means of resilient connecting elements and carries two downwardly extending secondary styli.

Instead of guiding the three styli in the same groove, separate grooves may be provided for the primary stylus and the secondary styli.

Obviously, such a record plate having two different grooves may be manufactured in such a manner that the secondary groove represents a diagram of the accumulated secondary acoustic energies so that a single secondary stylus only is to be controlled thereby. Such a secondary groove may produce, in addition to the corrective effect, separate acoustic effects such as space effects. As a small fraction only of the amplitude of the secondary styli is transmitted to the diaphragm, undesired deviations and changes of the secondary groove will not so soon cause disturbances in consequence of wear of the groove and of the stylus. The separate secondary groove guiding the secondary corrective stylus may be arranged between the windings of the spiral primary groove in form of a track generating vertical oscillations. In this case the secondary stylus may be formed by a flat or fork-shaped auxiliary pin which does not partake in the function of the primary stylus of guiding the diaphragm on its radial course. This, obviously facilitates the mutual adjustment of the stylus and reduces the wear of the grooves.

With regard to the unavoidable wear of record plates resulting in an obliteration of the groove, my invention affords the valuable advantage of improving the reproduction of sounds from such worn off record plates. Furthermore, my invention creates the possibility of producing record plates having from the beginning a flattened or obliterated record groove which is not subject to wear to the same extent as a correct groove, as will be evident from a comparison with the diagrams represented by a correct groove or a flattened groove. The correct sound diagram has steep peaks and sharp incisions similar to a spectral diagram, while the obliterated diagram shows gradual curves only.

In the manufacture of record plates the translation of successive acoustic impulses into a corresponding succession of stylus oscillations is not quite correct because of an obliteration under the influence of inertia effects, the produced sound groove obviously represents an obliterated diagram which, although not subject to wear to the same extent as a correct diagram, did not, prior to my invention, afford a possibility of correctly reproducing the sound. In this regard my invention provides a remedy as is evident from the foregoing explanations.

Another advantage resides in the possibility of accumulating a record extending over a substantially longer period of time on the space of the ordinary record plates, since obliterations which might be expected from the compact record are compensated for by the refined reproduction.

Another important field to which my invention is applicable is the method of translating the succession of acoustic energies or impulses into a corresponding succession of optical fluctuations which are subsequently recorded on a light sensitive film, for instance on the marginal range of a moving picture film, as is well known in the art of talking moving pictures or of recording sounds for subsequent manufacture of record plates. The reproduction of the sound is accomplished by feeding the film past a slot through which a ray is projected. The ray is controlled by the film to produce light fluctuations which are translated into corresponding current fluctuations which are eventually translated into acoustic oscillations.

Such sound record films may be compared with the spectral records, discussed in my co-pending application Ser. No. 309,373, as far as the fluctuations in intensity and the obliteration of the succession to be recorded are concerned. Even a small departure from the correct succession of different transparencies in the film cause serious disturbances, particularly in complicated sound compositions, for instance female voices, treble sounds, orchestra music, and choirs of many voices.

As in case of moving pictures the speed of the film is limited depending, as it does, on the number of pictures per second, the space available for recording sounds of the highest frequency which determine the quality of the reproduction of treble sounds, amounts to but 1/43 m/m. When a single ray produced by a narrow slot is used in the manufacture of the film and the reproduction of the sound as it has been the general practice prior to my invention, numerous difficulties and disturbances result from the small energy available and from the influence of the grain of the light sensitive layer of the film. Owing to the small energy a strong amplification is required causing unavoidable distortions. If the lens inserted between the slot in the film is dimensioned as large as possible to increase the intensity of radiation, the slightest changes in the distance between the lens and the film cause serious disturbances. On the other hand, a larger energy could not be provided for by an increase of the width of the slot because this would result in the same obliterations which have been discussed in connection with the spectroscopic application of my invention, described in my co-pending application Ser. No. 309,373.

In order to avoid these disadvantages resulting in a distorted sound reproduction, according to my invention secondary ranges may be combined as corrective terms with the primary range in a similar manner as in the spectral analyzation whereby the spatial and temporally overlapping effect caused by the use of a broad slot and a broad controlling range in the reproduction may be compensated for.

Also in this case the corrective effect may directly be obtained in suitably constructed receivers similar to the photometry of spectral photo-pictures, or the corrective effect may be produced in the course of any other stage of the method. If the optical fluctuations for recording the sound are produced by a source of light controlled by microphone currents, the secondary effects may be combined with the primary effect in the amplifier or this combination may be accomplished by a suitable construction of the microphone in which the overlapping of the secondary impulses is directly obtained.

If the optical fluctuations are produced by means of reflector directly controlled by the acoustic oscillations, the additional controlling effect of the secondary ranges upon the reflector may be exerted by mechanical, electric or electro-magnetic cooperative connections. In the reproduction of the sound from the record film by photoelectric means translating the differences in transparency of the film into current oscillations, and the latter into acoustic oscillations, the corrective combination of the secondary ranges with the primary range may be performed in anyone of the various stages.

This does not only offer the advantage that the sound record may be left un-refined to a certain degree, and that changes in the distance of the film from the projecting lens are of minor consequence, but strong light intensities may be used for the recording stage as well as for the reproduction of the sound from the record, which is of particular importance, if the current fluctuations produced from the record are to operate an engraving needle for the manufacture of a record plate. As in this case a positive control of the needle may be obtained without an excessive amplification. Another advantage resides in the possibility of crowding the acoustic record on the field so that even a film comprising a small number of pictures per second only affords sufficient space for satisfactory sound records which is obviously of high economic importance.

In Fig. 3 I have shown an apparatus for reproducing talking moving pictures in which the corrective principle according to my invention is applied, the essential parts only being shown for sake of simplicity. The film 6 wound round a roll 5 and drawn from the same by a suitable roll 7 is provided on its lower portion with the pictures to be projected on the screen by means of a suitable projection apparatus not shown. The coordinated sound record is formed by a photographic nontransparent layer on the upper portion of the film which covers the entire half of the film in places in which the sound intensity equals zero and covers the upper margin only of the film in places expressing powerful sound intensity. It may be assumed that the graduation in the transparency of the layer expressing the sound oscillation is obliterated similarly to an obliterated spectrum owing to an overlapping of the temporally successive effects.

In order to translate this obliterated succession of different transparencies of the layer into the corresponding refined succession of acoustic impulses, I expose not only a narrow vertical stripe to the sound reproducing ray $a$ as it has been the practice prior to my invention, but, in addition thereto, project secondary rays $b$, $c$ through secondary ranges adjacent to said stripe in a similar manner as described in my co-pending application Ser. No. 309,373 in connection with the analyzation of an obliterated spectral photographic record. The effect produced by the secondary rays is correctively combined with the primary effect in the subtractive manner explained in connection with the other applications of my invention.

The projecting rays are produced by means of a suitable source of light 1, a collecting lens 2 projecting the beam of light upon a screen 3 having a relatively wide vertical slot. The slot is covered with a colored light filter comprising a vertical central portion transparent to blue and green rays and lateral portions transparent to yellow and red rays. The lens 4 collects the beam issuing from the slot of screen 3 and projects the same upon the film 6 so that the blue and green rays penetrate the sound recording layer on the film along a vertical line, while the red and yellow rays pass through said layer on both sides of that line. It is to be understood, of course, that the term "line" is not to be taken in the mathematical sense as the line has a substantial width corresponding to the breadth of the blue green portion of the aforementioned color filter.

The three rays or beams penetrating the layer to an extent depending upon the transparency in that particular place are preferably cast upon a prism 8 covered on its back with a color filter 9 pervious to blue and green rays. The major part of the rays passes through the filter 9 to a photoelectric cell 12 containing potassium highly sensitive to blue and green rays. This cell, consequently, is exclusively controlled by that beam which passes through the central portion of the scanned range of the film. A part of the rays is reflected on the front of the prism 8 and traverses a light filter 10 pervious to red and yellow light to control a photoelectric cell 11 sensitive to yellow and red light. Hence, this cell is influenced by both secondary rays $b$ and $c$ passing through the secondary ranges of the film. To insure the reflection of a substantial part of the rays on the front of the prism 8 the same is preferably covered with a slightly reflecting layer. If the photoelectric cells are operated with direct current voltage and controlled by intermittently interrupted rays of so high a frequency that the frequency of the generated electric impulses may be amplified without interfering with the acoustic frequency to be transmitted, the fluctuating currents furnished by the primary cell and the secondary cell may be combined in a transformer having counteracting windings. In the transformer the secondary effects correct the primary fluctuations. The transformer may form part of an amplifier.

If a resistance amplifier is used instead of a transformer amplifier, for instance of the type described by Schröter in the periodical "Elektrotechnische Zeitschrift", 1926, page 719, Fig. 3, the corrective influence of the secondary cell upon the fluctuation current delivered by the primary cell may be affected by connecting the secondary cell in shunt to the grid resistance leading off the grid charge of the first amplifier tube. If with such a connection the secondary cells receive a stronger optical energy, they offer a smaller resistance to the grid charge and, consequently, leak off a larger portion of the same. This effect counteracts the effect of the primary cell. Another possibility resides in substituting the grid resistance by the secondary cell which in this case would have to be designed to be of small capacity. In order to ensure a permanent leaking off effect, the cell is to be subjected to an auxiliary permanent exposure ensuring permanent conductibility.

Instead of a single beam of different colored rays and instead of subsequently separating the rays, an arrangement may be used in which beams are projected from different directions, or an arrangement in which the secondary beams are diverted by reflectors after having passed the film.

When utilizing the new method for sound record disks, it seems likely that, besides the improved sound reproduction or the greater intensity of the sounds, the sound succession can be compressed locally, whereby space will be gained for longer reproductions. Not less important is the greater saving, especially for more sensitive curve parts, as obtained by the now possible mitigation of the sharply pointed parts of the harmonics, and furthermore, the possibility to make use of the correction members also for separate purposes, as, for instance, intensifying amplifying effects.

The possibility heretofore discussed of combining larger ranges without affecting the fineness of the analyzation results in essential and important improvements with regard to inertia effects in so far as the essentially increased energy from the larger ranges permits a more rapid adjustment.

The use of a photographic record as shown in Fig. 3 affords the possibility of performing my invention in another simple and accurate manner. The picture of the record may be transformed into or developed as a positive picture shown in the central position in Fig. 4 and representing the primary amounts of acoustic energy $E\lambda$. In addition to this picture, two other negative pictures, shown at the top and at the bottom of Fig. 4 are taken differing from the primary picture in that they are produced in a fraction of the exposure of the primary picture. These additional pictures, the secondary pictures, are superimposed upon the primary picture in such a manner that the points $\lambda$ of the primary record register with the coordinated points $\lambda+a$ and $\lambda-a$ of the secondary record, or in other words, the secondary pictures are so placed upon the primary pictures that corresponding points in the respective spectra are spaced by the amount of $a$. The transparency left in the composite picture formed by the three superimposed films approximately represents the sound record corrected in accordance with Formula 1, for the range over its entire length. The corrected record so obtained may be analyzed in any reproducer which may be of customary construction except for the analyzing slot or the scanning beam of light which may be made much wider than would be possible with ordinary records.

Obviously, however, the corrected record obtained by photographically superimposing the primary and the secondary ranges may be employed in the apparatus shown in Fig. 3 to further improve and refine the resolution.

The principle upon which this combination of three pictures is based will appear from the following consideration: The transparency of the positive primary picture which may be proportional to the amplitude $E\lambda$ of the acoustic oscillations recorded, is at each point reduced by the superimposed negative pictures. This reduction in transparency amounts at each point to a degree proportional to a fraction of the accumulated secondary acoustic energies or amplitudes $E\lambda^+$ and $E\lambda^-$. The greater the secondary amplitudes $E\lambda^+$ and $E\lambda^-$ are, the less transparent are the superimposed secondary negative pictures and the greater is the reduction in transparency of the composite picture. In order to obtain the desired value of said fraction, the negative pictures must be manufactured either with a comparatively short exposure or by means of an appropriate chemical treatment in the course of their development.

The component negative records may be produced either simultaneously or in alternation with the positive primary record, and may be directly combined therewith in order to obtain the correct composite effect. The necessary relative displacement may be accomplished by well known optical means.

Another solution of the problem of producing the subtracting effect of the secondary records upon the primary records resides in producing the primary record $E\lambda$ and the accumulated secondary records $1/14\ (E\lambda^+ + E\lambda^-)$ as separate negative or positive pictures which are arranged on the film in parallel relation and displaced to each other by the required degree. In Fig. 5 I have diagrammatically illustrated these two pictures.

The advantage offered by the heretofore described correction of photographic records by photographic superposition, in preference to the direct reproduction by suitably combined analyzers (as shown in Fig. 3) adapted to correctively analyze the original record, resides in the highly important possibility of using existing reproducers of customary construction, which may have a relatively wide slot, but nevertheless may accurately analyze even those oscillations which are of extremely high frequency.

What I claim is:

1. In a system of reproducing sound from a record, the method of using a relatively wide resolving member to give effects corresponding to a theoretically fine resolving member which comprises selecting a unit of the record adjacent to the unit under analysis and affecting the response from the unit under analysis by subtracting a response obtained from said selected unit.

2. A system according to claim 1, characterized by selecting two units adjacent to the record unit under analysis and affecting the response from the unit under analysis by subtracting the response obtained from one and adding the response obtained from another of said selected units.

3. A system according to claim 1, characterized by selecting four units adjacent to the record unit under analysis and affecting the response from the unit under analysis by subtracting the response obtained from two and adding the response obtained from the other two of said selected units.

4. A system according to claim 1, characterized by affecting the response from the unit under analysis in accordance with the formula $$C.E\lambda^\circ = E\lambda - D(E\lambda^+ + E\lambda^-) + F(E\lambda^{++} + E\lambda^{--}).$$

5. In a system of reproducing sound from a photographic record, means for projecting a relatively wide beam of light covering a plurality of elemental units of the sound record, means including a photoelectric cell for translating the characteristics of each unit into corresponding electric currents, means including a supplementary photoelectric cell for detecting the characteristics of adjacent units, and means controlled by said last mentioned means for reducing said translated currents to compensate for the undesirable effects produced by the width of said beam.

6. The method of analyzing a photographic sound record, which comprises making a positive picture representing the primary amounts of acoustic energy $E\lambda$, making two negatives of the same record in a fraction of an exposure of the positive, superposing said negatives upon the positive so that the points $\lambda$ of the positive register with the points of $\lambda+a$ of one and $\lambda-a$ of the other negative, and analyzing the composite consisting of three superimposed records by means of a relatively wide resolving member, the transparency of the composite picture representing the sound record corrected in accordance with the formula $$E\lambda^\circ = A[E\lambda - B(E\lambda^+ + E\lambda^-)].$$

CARL MÜLLER.